United States Patent [19]

Blanding

[11] Patent Number: 5,093,685
[45] Date of Patent: Mar. 3, 1992

[54] SCANNER APPARATUS

[75] Inventor: Douglass L. Blanding, Rochester, N.Y.

[73] Assignee: Eastman Kodak Company, Rochester, N.Y.

[21] Appl. No.: 634,635

[22] Filed: Dec. 27, 1990

[51] Int. Cl.$^5$ .............................................. G03B 27/52
[52] U.S. Cl. ........................................ 355/43; 355/77
[58] Field of Search ............................... 355/233–235, 355/42, 43

[56] References Cited

U.S. PATENT DOCUMENTS

| | | | |
|---|---|---|---|
| 2,795,418 | 6/1957 | De La Motte | 271/2.5 |
| 3,161,323 | 12/1964 | Bent | 222/41 |
| 3,767,301 | 10/1973 | Solo | 355/84 X |
| 4,471,888 | 9/1984 | Herb et al. | 222/137 |
| 4,505,578 | 3/1985 | Balasubramanian | 355/43 |
| 4,776,490 | 10/1988 | Wingert | 222/146.5 |
| 4,849,795 | 7/1989 | Spehrley, Jr. et al. | 355/317 |

Primary Examiner—L. T. Hix
Assistant Examiner—D. Rutledge
Attorney, Agent, or Firm—Donald D. Schaper

[57] ABSTRACT

Scanner apparatus is disclosed for providing relative movement between a receiving medium and a recording device. The scanner apparatus comprises an elongated bar which supports the receiving medium. The bar is mounted for movement in a pair of support blocks. A movable support block is adapted to grip the bar and move the bar through a series of small steps of a fixed distance. The movable support block releases the bar at the completion of each step and returns to a starting position. When the movable support block releases the bar after each step, a fixed support block clamps the bar in position. In the operation of apparatus such as a laser printer, the fixed support block holds the receiving medium in a fixed position during the scan of one line of data, and the movable support block moves the carriage one step between line scans.

19 Claims, 4 Drawing Sheets

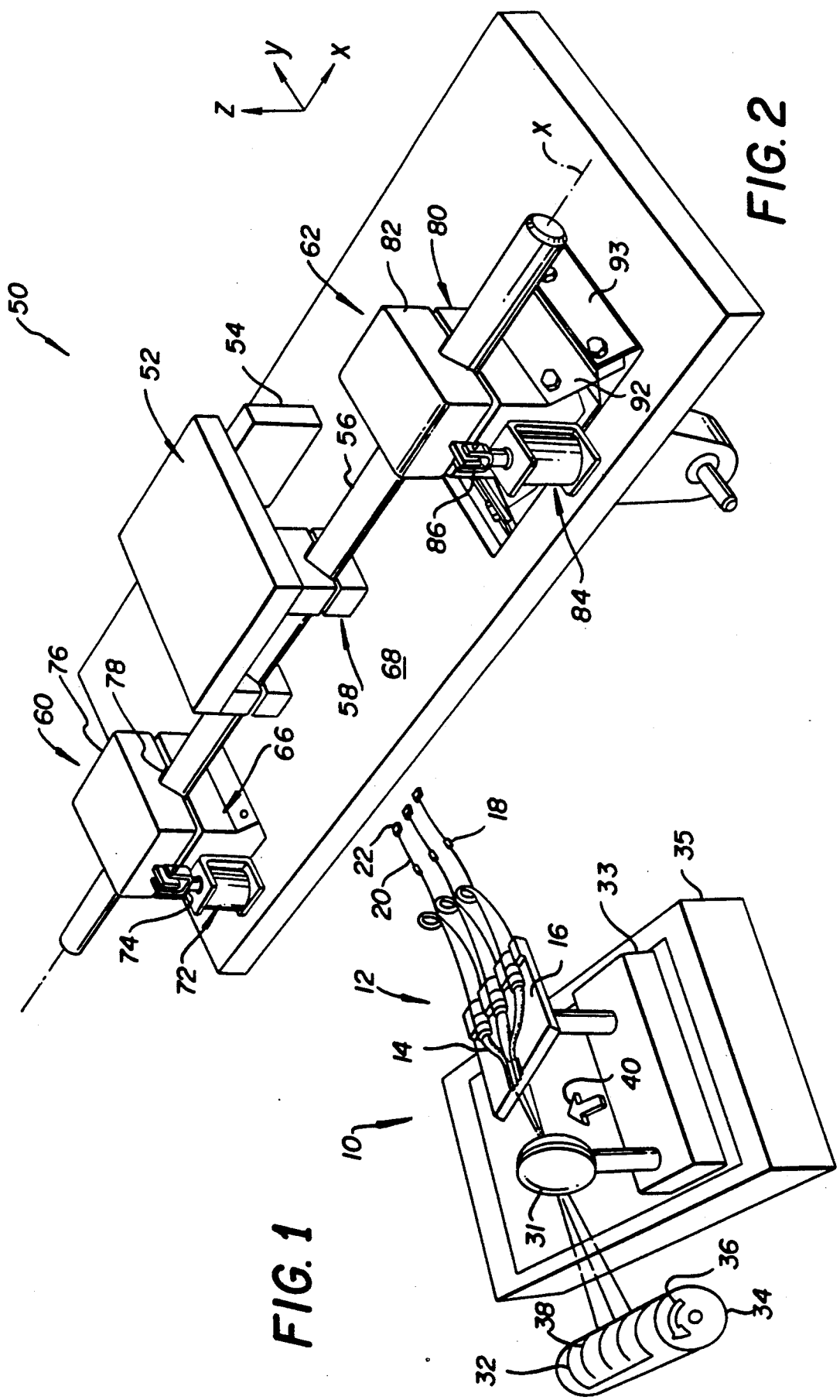

SCANNER APPARATUS

BACKGROUND OF THE INVENTION

1. Field of the Invention

The present invention relates to scanner apparatus, and more particularly, to apparatus for providing relative movement between a receiving medium and a recording device.

2. State of the Prior Art

It is known in apparatus such as a laser printer to provide some means for moving a receiving medium after each line of data is written. In one known type of apparatus, a lead screw is used to advance the receiving medium in the "slow scan" direction. One problem in the use of lead screws is that artifacts can occur as a result of very minute variations of lead screw pitch. These artifacts can appear as repetitive patterns, or "banding," in the image. The eye is extremely sensitive to periodic variations of density in an image, especially in areas which are nominally of uniform tone. In order to achieve band-free images in scanner apparatus using lead screws, extremely high precision lead screws are necessary. However, such lead screw are too expensive for many applications.

Other techniques have been used in an attempt to provide a relatively inexpensive carriage for a receiving medium. For example, in U.S. Pat. No. 4,505,578, there is disclosed a braked gravity transport for moving a carriage for a receiving medium. The carriage is propelled by a falling mass which works against a piston that is supported in a cylinder containing hydraulic fluid. A valve limits the flow of hydraulic fluid out of the cylinder so that the fall of the mass, and hence the carriage, is braked to a uniform velocity. The velocity of the carriage is controlled by controlling the rate of fluid flow through the valve. One problem in the use of such a device is that it is very difficult to get a uniform velocity throughout the full extent of the carriage movement. A further problem is that the hydraulic system is too bulky and complex for certain types of scanners.

SUMMARY OF THE INVENTION

It is an object of the present invention to overcome the problems in the prior art discussed above and to provide an improved scanner apparatus.

In accordance with one aspect of the invention, there is provided scanner apparatus for use in effecting relative movement between a receiving medium and a scan element, the apparatus comprising: means for mounting one of the elements for movement along a predetermined path; means for moving the mounting means in a series of steps along the path, the moving means including movable support means for sequentially gripping and releasing the mounting means to move the mounting means through the steps.

In one embodiment of the present invention, the scanner apparatus comprises a movable carriage mount which is fixed to an elongated bar. The bar is supported for movement in a pair of support blocks. A movable support block is adapted to grip the bar and move the bar through a series of small steps of a fixed distance. The movable support block releases the bar at the completion of each step and returns to a starting position. When the movable support block releases the bar after each step, a fixed support block clamps the bar in position. Thus, in the operation of a scanner, the fixed support block holds the carriage in an adjusted position during the scan of one line, and the movable support block moves the carriage one step before the start of the next scan line.

A principal advantage of the present invention is that a carriage can be repeatedly and precisely moved through a series of steps of a fixed distance in order to produce an image which is free of banding. A further advantage of the apparatus of the present invention is that it is much less expensive than known precision advance mechanisms.

Other features and advantages will become apparent with reference to the following description of the preferred embodiment when read in light of the attached drawings.

BRIEF DESCRIPTION OF THE DRAWINGS

FIG. 1 is a perspective view of a printer of a type which can utilize the present invention;

FIG. 2 is a perspective view of one embodiment of the scanner apparatus of the present invention;

DESCRIPTION OF THE PREFERRED EMBODIMENTS

Figure 3:
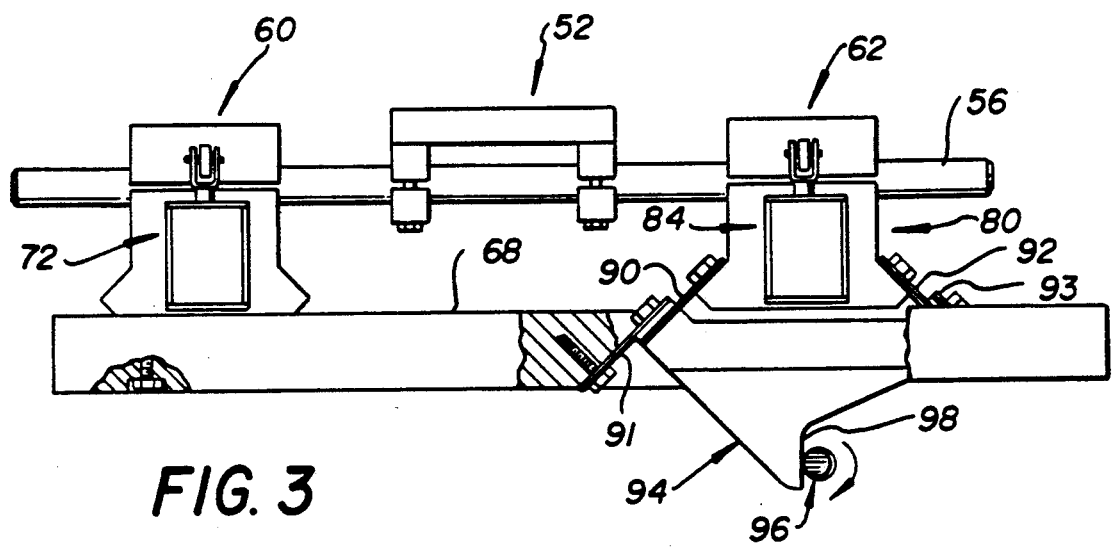
FIG. 3 is a front elevational view of the scanner apparatus shown in FIG. 3.

The present invention is described herein with reference to a printer. However, the invention is also applicable to an input scanner which is used to convert an image into an electrical signal. The term "receiving medium," as used herein is intended to include any medium on which an image can be formed as well as any medium which has an image formed thereon such as, for example, a photographic film, a photoconductor, or a document.

With reference to FIG. 1, there is shown a printer 10 of a type in which apparatus of the present invention can be used to effect relative movement between a receiving medium and a scan head. Printer 10 includes a scan head in the form of a fiber optic array 12. Fiber optic array 12 is made up of three operative elements, each of which includes an optical fiber 14 supported on a substrate 16. Each optical fiber is connected by means of an optical fiber connector 18 to another fiber 20. Each of the optical fibers 20 is connected to a light source 22 such as a diode laser or a light-emitting diode. Each light source 22 in array 12 can be modulated according to an information signal in a well-known manner. Light from optical fibers 14 is focused on a receiving medium 32 by means of a lens 31. Both lens 31 and fiber optic array 12 are mounted on a carriage 33 which is supported for linear movement on a frame 35. The number of operative elements in array 12 is shown as three in FIG. 1. It will be apparent, however, that the number of elements could be more or less than three. Receiving medium 32 is supported on a drum 34 which is driven in the direction of arrow 36. The receiving medium 32 can be, for example, photographic film. As drum 34 is rotated, a set of raster lines 38 are formed on receiving medium 32, and at the completion of each set of raster lines 38, carriage 33 is advanced a constant distance in the direction of arrow 40. Successive sets of raster lines 38 are traced on receiving medium 32 until a desired image has been completed.

Scanner apparatus 50 constructed in accordance with the present invention is shown in FIGS. 2-5. Scanner apparatus 50 can be used, for example, to drive the carriage 33 in printer 10 in order to provide relative movement between receiving medium 32 and the fiber optic array 12. With reference to FIG. 2, a movable carriage mount 52 is mounted for slidable movement on an element 54 and is fixed to a bar 56 by means of clamps 58. Bar 56 is supported at one end in a fixed support block 60 and at an opposite end in a movable support block 62.

Fixed support block 60 comprises a base 66 which is mounted on a plate 68. Plate 68 can be mounted on frame 35 in printer 10. Base 66 includes a groove therein (not shown) for receiving bar 56. A solenoid 72 is mounted on base 66, and a plunger 74 in solenoid 72 is fixed to a movable cap 76. Cap 76 is mounted to the base 66 by means of a flexure element (not shown). Cap 76 has a groove 78 in a bottom surface thereof which is adapted to receive bar 56. Upon energization of solenoid 72, a force is exerted on cap 76 in the direction of base 66, and the bar 56 is gripped or clamped between cap 76 and the base 66 to hold carriage mount 52 in a fixed position.

Figure 4:
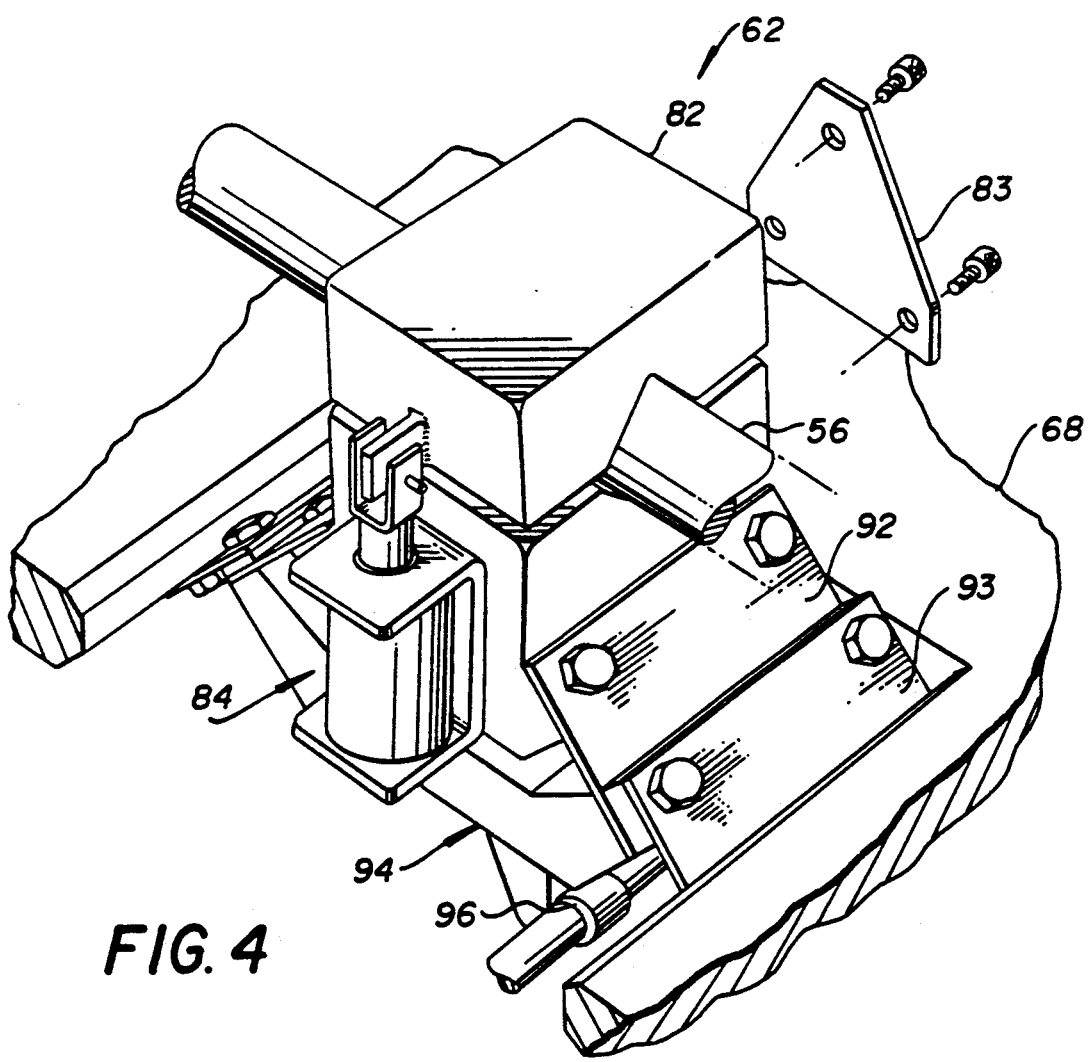
FIG. 4 is a perspective view of the movable support block used in the present invention.
Figure 5:
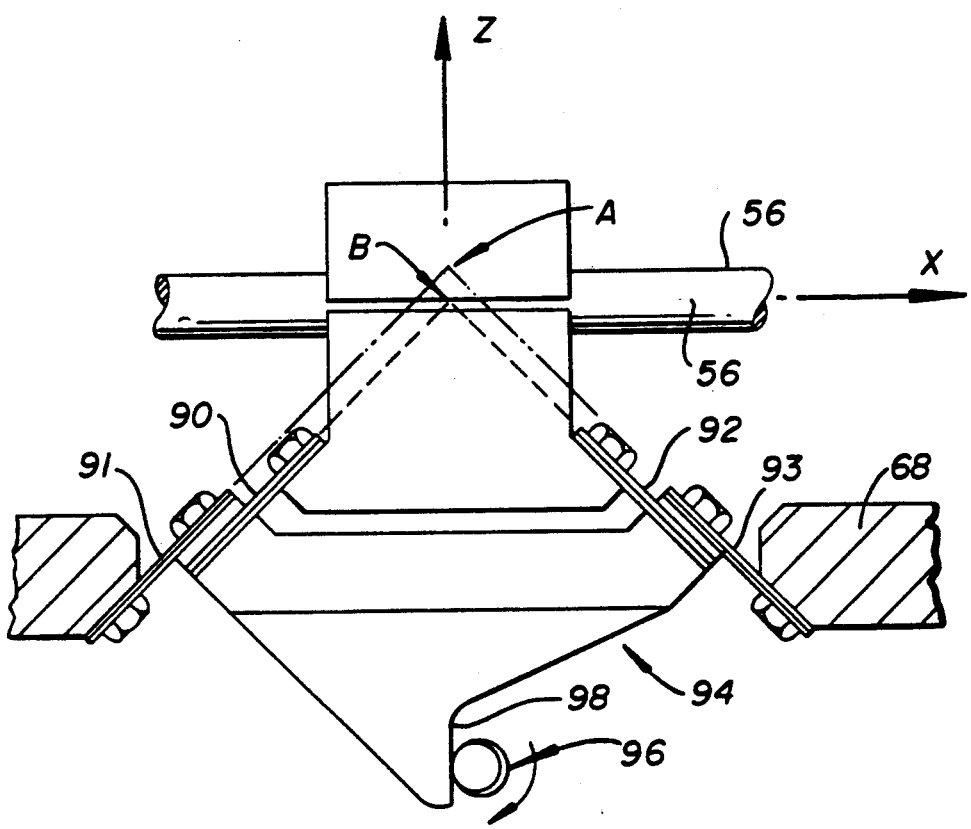
FIG. 5 is a front elevational view of the movable support block.

Movable support block 62 includes a base 80, a cap 82, and a solenoid 84 having a plunger 86 attached to cap 82. Cap 82 is fixed to base 80 by means of a flexure element 83 (FIG. 4). Movable support block 62 is attached to a lever 94 by means of flexible elements 90 and 92 (FIGS. 3 and 5). Lever 94 is mounted to plate 68 through flexible supports 91 and 93. The flexible elements 90 and 92 and flexible supports 91 and 93 can be made from steel, beryllium copper, brass or other sheet material, and in certain applications, these elements and supports can be laminated to increase their flexibility. A cam 96 is adapted to bear against a follower portion 98 of lever 94 in order to move support block 62 along the x axis.

As shown in FIG. 5, the planes of the elements 91 and 93 intersect at point A which is the instantaneous center of rotation of lever 94 relative to plate 68. Support block 62 is mounted to lever 94 such that the pivot point of block 62 is at point B. Due to the large ratio between the distance from point A to point B and the distance from point A to cam 96, point B will move a very small amount compared with the amount of motion at cam 96. Such a motion produces a small precise movement of bar 56 along the x axis, for example, about 8 microns.

In operation of apparatus 50 to provide a stepped movement of carriage mount 52, solenoid 72 would first be deenergized to unclamp block 60, and solenoid 84 would be energized to clamp movable support block 62 to bar 56. Cam 96 is then rotated through approximately 180° to move block 62 and bar 56 one step or increment which would be equal to the distance between two scan lines. At the end of this movement along the x axis, solenoid 72 in support block is actuated to clamp bar 56 in position. As cam 96 is rotated through another 180° to complete one revolution, movable support block 62 is returned to its starting position by flexible elements 90 and 92. This action is repeated until the scan operation for an image has been completed. The distance which the carriage mount is moved in each step is sufficiently precise to prevent banding in the recorded image.

Figure 6:
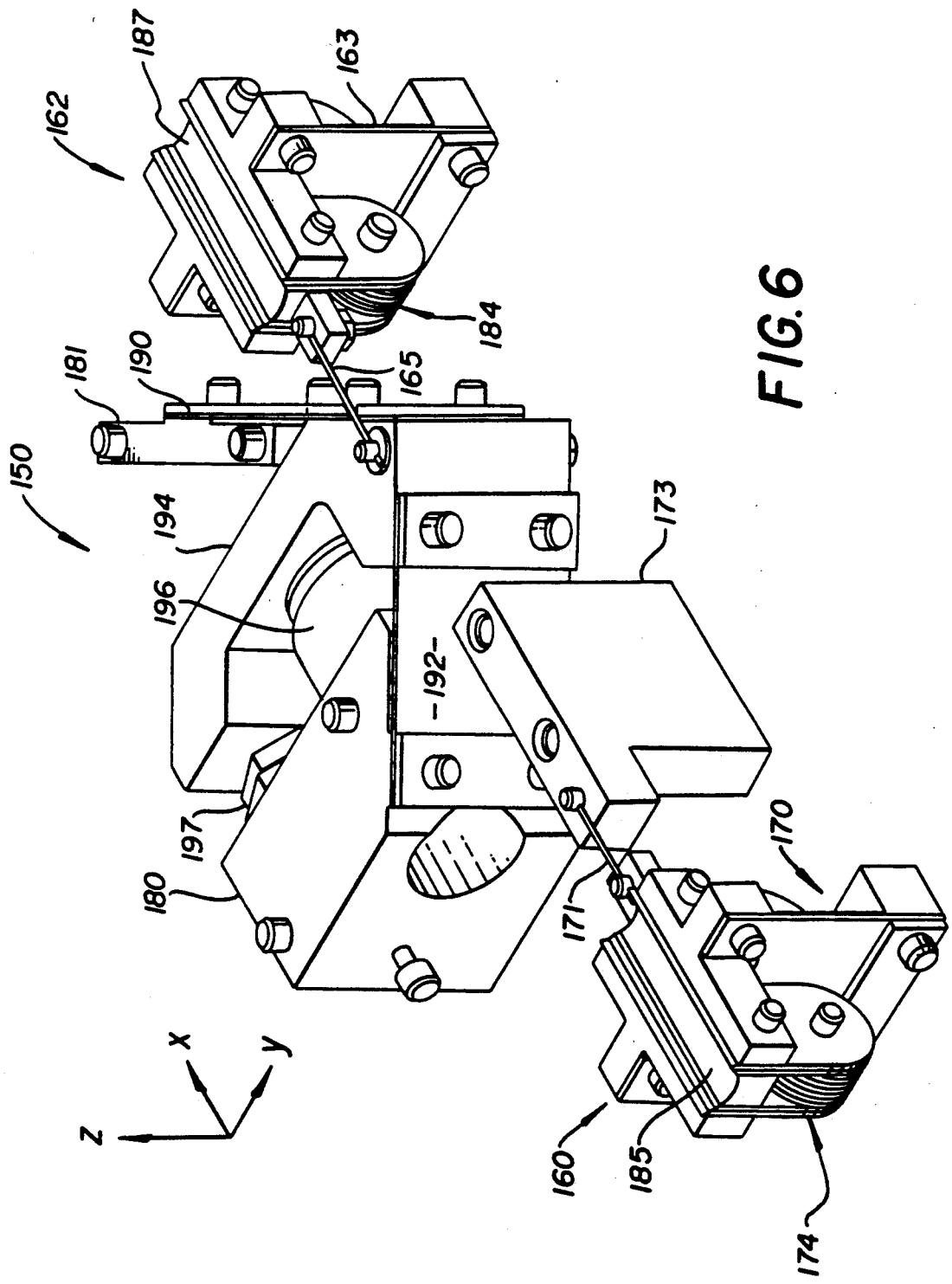
FIG. 6 is a perspective view of a second embodiment of the present invention.

A second embodiment of the present invention is shown in FIG. 6. In FIG. 6, scanner apparatus 150 is shown which operates in generally the same manner as scanner apparatus 50. Scanner apparatus 150 comprises a fixed support block 160 and a movable support block 162. Support block 160 is anchored to a frame (not shown) by means of a base 170 which is fixed to the frame and by means of a connection, through an element 171, to a block 173 which is fixed to the frame. An electromagnet 174 is adapted to function with a bar (not shown) supported in a groove 185; the bar can be made of a magnetic material, for example, steel. The electromagnet 174 is disposed such that a magnetic circuit, created when the electromagnet 174 is energized, would be completed by the bar. When the electromagnet 174 is energized, the bar will be clamped in groove 185, and when the electromagnet 174 is deenergized, the bar can be moved in groove 185.

Movable support block 162 includes an electromagnet 184 which functions in the same manner as electromagnet 174 to releasably clamp a bar (not shown) in a groove 187. Movable support block 162 is anchored to a frame (not shown) through a flexible support 163 which can flex along the x axis when a force is applied to the support 162. Movable support block 162 is tied through an element 165 to a lever 194 which is connected to flexible supports 190 and 192. Supports 190 and 192 are also connected to base elements 181 and 180, respectively, which are fixed to a frame (not shown). Lever 194 is movable between two stops (not shown) which are located a predetermined distance apart. A solenoid 196 is adapted, upon energization, to move lever 194 from one stop to the other stop, and a spring indicated at 197 is adapted to return the lever 194 to the one stop when the solenoid 196 is deenergized. A cam (not shown) could be used to actuate lever 194, as shown in scanner apparatus 50. When solenoid 196 is operated in timed relation to electromagnets 174 and 184, a stepping action is produced in a bar (not shown) supported on blocks 160 and 162; this stepping action can be used in the manner described above to drive a carriage in a scanner such as printer 10.

The invention has been described in detail with particular reference to the preferred embodiments thereof, but it will be understood that variations and modifications can be effected within the spirit and scope of the invention.

I claim:

1. Scanner apparatus for use in effecting relative movement between a receiving element and a scan element, said apparatus comprising:
   means for mounting one of said elements for movement along a predetermined path; and
   means for moving said mounting means in a series of steps along said path, said moving means including movable support means for sequentially gripping and releasing said mounting means to move the mounting means through said steps.

2. Scanner apparatus, as defined in claim 1, wherein said movable support means includes first clamp means for gripping said mounting means.

3. Scanner apparatus, as defined in claim 2, wherein said apparatus includes electromagnetic means for actuating said clamp means.

4. Scanner apparatus, as defined in claim 3, wherein said movable support means is mounted to a frame by a flexible means.

5. Scanner apparatus, as defined in claim 4, wherein said movable support means is moved in a first direction along said path by means of a cam operable thereon.

6. Scanner apparatus, as defined in claim 5, wherein said movable support means is moved in a direction opposite to said first direction by said flexible means.

7. Scanner apparatus, as defined in claim 4, wherein said movable support means is moved in a first direction along said path by a solenoid.

8. Scanner apparatus, as defined in claim 1, wherein said apparatus includes fixed support means.

9. Scanner apparatus, as defined in claim 8, wherein said fixed support means includes second clamp means which is actuatable in timed relation to said first clamp means.

10. Scanner apparatus, as defined in claim 9, wherein said second clamp means is actuatable by electromagnetic means.

11. Scanner apparatus, as defined claim 10, wherein said electromagnetic means is a solenoid.

12. Scanner apparatus, as defined in claim 11, wherein said mounting means includes an elongated bar, and said electromagnetic means is operable on said bar.

13. Scanner apparatus for providing relative movement between a receiving medium and a scan element, said apparatus comprising:
means for supporting said receiving medium;
means for supporting said scan element;
means for moving one of said supporting means relative to the other means, said moving means comprising first means for releasably holding said one supporting means in a series of adjusted positions and second means for moving said one supporting means between adjusted positions; and
means for actuating said first and second means in sequence.

14. Scanner apparatus, as defined in claim 13, wherein said one supporting means includes an element for receiving a clamping force, said element being supported for movement.

15. Scanner apparatus, as defined in claim 14, wherein said first means is actuated by a solenoid.

16. Scanner apparatus, as defined in claim 15, wherein said second means includes means for exerting a clamping force on said element, and cam means for moving said element after said means for exerting a clamping force has been actuated.

17. Scanner apparatus, as defined in claim 16, wherein said element is an elongated bar, and said first means include means for gripping said bar.

18. Scanner apparatus, as defined in claim 14, wherein said element is an elongated bar, said first means includes an electromagnet for attracting said bar to a fixed support, and said second means includes an electromagnet for attracting said bar to a movable support.

19. Scanner apparatus for use in effecting relative movement between a receiving element and a scan element, said apparatus comprising:
means for mounting one of said elements for movement along a predetermined path;
movable support means for sequentially gripping and releasing said mounting means to move the mounting means through a series of steps along said path; and
fixed support means for holding said mounting means in a fixed position after said movable support means has released the mounting means.

* * * * *